United States Patent [19]

Turri et al.

[11] Patent Number: 5,508,380
[45] Date of Patent: Apr. 16, 1996

[54] FLUORINATED POLYMERS CONTAINING PERFLUOROPOLYOXYALKYLENE SEQUENCES AND HAVING THERMOPLASTIC ELASTOMERIC PROPERTIES

[75] Inventors: Stefano Turri, Milan; Giuseppe Gianotti, Novara; Marinella Levi, Milan; Claudio Tonelli, Concorezzo, all of Italy

[73] Assignee: Ausimont, S.p.A., Milan, Italy

[21] Appl. No.: 524,104

[22] Filed: Aug. 21, 1995

Related U.S. Application Data

[63] Continuation of Ser. No. 228,023, Apr. 15, 1994, abandoned.

[30] Foreign Application Priority Data

Apr. 19, 1993 [IT] Italy ................. MI93A0758

[51] Int. Cl.$^6$ ................. C08G 73/24
[52] U.S. Cl. ................. 528/401; 528/272; 528/310; 528/332; 528/367; 528/373; 528/402
[58] Field of Search ................. 528/272, 310, 528/332, 401, 402, 367, 373

[56] References Cited

U.S. PATENT DOCUMENTS

| | | | |
|---|---|---|---|
| 3,023,192 | 2/1962 | Shivers, Jr. ................. | 528/300 |
| 3,665,041 | 5/1972 | Sianesi et al. ................. | 568/601 |
| 3,715,378 | 2/1973 | Sianesi et al. ................. | 558/283 |
| 3,763,109 | 10/1973 | Witsiepe ................. | 528/301 |
| 3,766,146 | 10/1973 | Witsiepe ................. | 528/301 |
| 3,784,520 | 1/1974 | Hoeschele ................. | 528/301 |
| 3,810,874 | 5/1974 | Mitsch et al. ................. | 528/70 |
| 3,847,978 | 11/1974 | Sianesi et al. ................. | 562/577 |

FOREIGN PATENT DOCUMENTS

| | | |
|---|---|---|
| 0148482 | 7/1982 | European Pat. Off. . |
| 0151877 | 8/1985 | European Pat. Off. . |
| 0294829 | 12/1988 | European Pat. Off. . |
| 0538827 | 4/1993 | European Pat. Off. . |
| 0538828 | 4/1993 | European Pat. Off. . |
| 0621296 | 10/1994 | European Pat. Off. . |
| 2011774 | 9/1970 | Germany . |
| 1217871 | 12/1971 | United Kingdom . |

OTHER PUBLICATIONS

Pilati, et al. "Synthesis of Polyesters–Perfluoropolyethers Block Copolymers," *Polymer Bulletin*, vol. 28, pp. 151–157 (1992).

European Search Report for EP 94 10 5855 (EPO counterpart of pending application).

*Primary Examiner*—Samuel A. Acquah
*Attorney, Agent, or Firm*—Bryan Cave

[57] ABSTRACT

Fluorinated polymers having thermoplastic elastomeric properties comprising in the macromolecule perfluoropolyoxyalkylene sequences of formula:

$$-CF_2O-(CF_2CF_2O)_m-(CF_2O)_n-CF_2- \quad (I)$$

where m/n=0.2÷5, are obtained through polycondensation with suitable perfluoropolyoxyalkylene condensation monomers corresponding to formula (I), functionalized with suitable reactive groups and having a functionality at least equal to 1.97, preferably at least equal to 1.99.

Such polymers are characterized by an average molecular weight at least 50%, preferably at least 100%, higher than that of the corresponding polymers obtained starting from perfluoropolyoxyalkylenes corresponding to formula (I) having a functionality not higher than 1.96.

4 Claims, No Drawings

FLUORINATED POLYMERS CONTAINING PERFLUOROPOLYOXYALKYLENE SEQUENCES AND HAVING THERMOPLASTIC ELASTOMERIC PROPERTIES

This is a continuation of U.S. Application Ser. No. 08/228,023 filed Apr. 15, 1994 now abandoned.

The present invention relates to fluorinated polymers containing perfluoropolyoxyalkylene sequences and having thermoplastic elastomeric properties, endowed with high flexibility at low temperatures and superior mechanical properties at high temperatures. Such products can be utilized as sealing agents or for the manufacture of gaskets or fittings (pipes, couplings, etc.) to be employed in severe working conditions, where strong thermal variations and chemically aggressive substances are present.

From U.S. Pat. No. 3,810,874 fluorinated polymers are known, such as polyurethanes, polysiloxanes, polyesters, polycarbonates, polyesters-polyurea, polyamides, polyimides, containing perfluoropolyoxyalkylene sequences of formula:

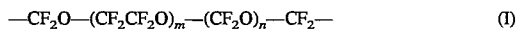

$$—CF_2O—(CF_2CF_2O)_m—(CF_2O)_n—CF_2— \qquad (I)$$

wherein m/n=0.2–5, linked each other by non-fluorinated monomeric units. Such polymers are obtained starting from a perfluoropolyoxyalkylene corresponding to formula (I) functionalized at both ends with a suitable reactive group (for example —OH, —NH$_2$, —CN, etc.) capable of giving polycondensation reactions with the typical organic reagents utilized in polycondensation reactions, such as polyisocyanates, polyacids, phosgene, anhydrides, diacylhalides, etc.

Other fluorinated polymers having polyacetalic structure, obtained by polycondensation of perfluoropolyoxyalkylene diols with formaldehyde, are described in Italian patent application No. 1990/MI 92A in the name of the Applicant.

As illustrated in U.S. Pat. No. 3,810,874 above which is herein incorporated by reference, the functionalized perfluoropolyoxyalkylenes are prepared starting from the corresponding perfluoropolyoxyalkylenes having —COF end groups.

For instance diols of formula:

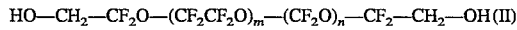

$$HO—CH_2—CF_2O—(CF_2CF_2O)_m—(CF_2O)_n—CF_2—CH_2—OH \quad (II)$$

are preparable by reducing by means of lithium and aluminium hydride diacylfluorides of formula:

$$FCO—CF_2O—(CF_2CF_2O)_m—(CF_2O)_n—CF_2—COF \qquad (III)$$

The hydroxyl groups of the diols of formula (II) can be in their turn transformed into other functional groups, such as sulphonic, amino, nitrile groups, etc., by reactions well known in the art. For instance from diols of formula (II) the sulphonic esters of formula

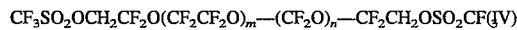

$$CF_3SO_2OCH_2CF_2O(CF_2CF_2O)_m—(CF_2O)_n—CF_2CH_2OSO_2CF_3 \quad (IV)$$

can be obtained by reaction with CF$_3$SO$_2$F.

In their turn, the sulphonic esters of formula (IV) can be utilized for the preparation of the corresponding diamines of formula:

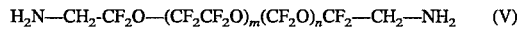

$$H_2N—CH_2-CF_2O—(CF_2CF_2O)_m(CF_2O)_nCF_2—CH_2—NH_2 \quad (V)$$

by reaction with anhydrous liquid ammonia.

As known, perfluoropolyoxyalkylenes having —COF end groups, and therefore all the other functionalized perfluoropolyoxyalkylenes deriving therefrom, are indeed perfluoropolyoxyalkylene mixtures in which the bifunctional products are mixed with monofunctional products, in which a terminal moiety is a functional group, while the other terminal moiety is a perfluoroalkyl group having 1 or 2 carbon atoms, or also with small amounts of non-functionalized products, in which both terminal moieties are of perfluoroalkyl type.

This fact is an unavoidable consequence of the preparation method of such products, which, as well known, consists in submitting tetrafluoroethylene to photooxidation under ultraviolet radiations, as described for instance in British patent 1,217,871 and U.S. Pat. No. 3,715,378, and subsequent reduction of the peroxidic bridges, as described for instance in U.S. Pat. No. 3,847,978. From such a process, chains of perfluorooxyalkylene units —CF$_2$CF$_2$O— and —CF$_2$O— are obtained, having as terminal groups —CF$_3$, —CF$_2$CF$_3$, —COF, —CF$_2$COF, besides lower amounts of —CF$_2$H groups.

Mixtures of products having perfluoropolyoxyalkylene structure are so obtained in which the macromolecules endowed with two functional end groups (—COF and/or —CF$_2$COF) do not exceed 94–98% by moles, corresponding to an average functionality of the mixture of 1.88–1.96.

The fluorinated polymers obtained, according to the art cited above, by polycondensation starting from perfluoropolyoxyalkylenes with functionality not higher than 1.96, though showing a low glass transition temperature (T$_g$), generally comprised between −120° and −100° C., and therefore, at least potentially, good elastic properties at low temperatures, have unsatisfactory mechanical characteristics at room temperature and above all at high temperatures. This fact strongly limits the rating temperature of such products.

The Applicant has now surprisingly found that it is possible to obtain polymers containing perfluoropolyoxyalkylene sequences and having properties of thermoplastic elastomers, endowed with high flexibility at low temperatures and superior mechanical properties at high temperatures, by polycondensation with suitable perfluoropolyoxyalkylene condensation monomers corresponding to formula (I), functionalized with suitable reactive groups and having a functionality at least equal to 1.97, preferably at least equal to 1.99. Such polymers are characterized by an average molecular weight at least 50%, preferably at least 100%, higher than that of the corresponding polymers obtained starting from perfluoropolyoxyalkylenes corresponding to the formula (I) having a functionality not higher than 1.96.

Object of the present invention are, therefore, fluorinated polymers having properties of thermoplastic elastomers comprising in the macromolecule perfluoropolyoxyalkylene sequences of formula:

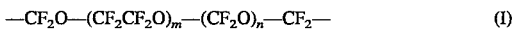

$$—CF_2O—(CF_2CF_2O)_m—(CF_2O)_n—CF_2— \qquad (I)$$

where m and n are numbers such as the m/n ratio is from 0.2 to 5, linked each other by organic groups deriving from one or more condensation monomers having a functionality equal to 2; said polymers having an average molecular weight at least 50%, preferably at least 100%, higher than that of the corresponding polymers obtained by polycondensation of perfluoropolyoxyalkylenes corresponding to formula (I) having a functionality lower than or equal to 1.96.

The perfluoropolyoxyalkylene units of formula (I) have generally a number average molecular weight of from 500 to 10,000, preferably from 1,000 to 4,000.

The fluorinated polymers object of the present invention are obtainable by reaction between one or more condensation monomers having a functionality equal to 2 and a perfluoropolyoxyalkylene of formula:

$$Z-CF_2O-(CF_2CF_2O)_m-(CF_2O)_n-CF_2-Z \quad (VI)$$

with m and n defined as above, while Z is a reactive group capable of giving a polycondensation reaction with said condensation monomers, said perfluoropolyoxyalkylene having a functionality at least equal to 1.97, preferably at least equal to 1.99.

By perfluoropolyoxyalkylenes of formula (VI) having a functionality at least equal to 1.97 we mean mixtures of bifunctional perfluoropolyoxyalkylenes with the corresponding monofunctional and/or neutral products, wherein the content of bifunctional products is higher than 98.5% by moles.

Perfluoropolyoxyalkylenes of such functionality can be obtained through an enrichment or separation process by means of column chromatography of perfluoropolyoxyalkylene mixtures having hydroxyl and/or amino functionality lower than or equal to 1.96, as obtained directly from the synthesis process. Such enrichment or separation process is described in Italian patent application No. 2774/MI 91A in the name of the Applicant, which is herewith incorporated by reference.

It is a process wherein the functionalized perfluoropolyoxyalkylene is eluted by means of an apolar fluorinated solvent (for instance Delifrene$^{(R)}$ LS, i.e. 1,1,2-trichloro-1,2,2-trifluoroethane) through a column containing as stationary phase a compound (for instance alumina or silica gel) having sites and/or active groups, capable of establishing bonds or polar interactions, or hydrogen bonds, with the perfluoropolyoxyalkylene hydroxyl and/or amino end groups. Such stationary phase is previously treated with a mixture consisting of a fluorinated apolar solvent and of a polar solvent (for instance a ketone or an alcohol) and having an eluotropic strength $\epsilon$ of at least 0.2 with respect to silica. When the first elution is over, during which the separation of neutral and monofunctional from bifunctional species is obtained, the latter remaining in the column, the perfluoropolyoxyalkylene with a functionality of about 2 is eluted with the fluorinated apolar solvent/polar solvent mixture used before, in a volume ratio comprised between 9/1 and 1/1. The stationary phase is then restored by washing with an apolar fluorinated solvent. Only one passage through the column is usually sufficient to obtain the product suitable to the purposes of the present invention. If necessary, it is possible to increase the functionality of the so obtained product with further passages through the column.

In Table 1 some examples of —Z reactive groups are ven, which can react with the common polycondensation monomers to give rise to the fluorinated polymers object of the present invention. Such polycondensation reactions are carried out according to known techniques, broadly described in literature for similar non-fluorinated polymers.

In Table 1 a possible scheme for the synthesis of functionalized perfluoropolyoxyalkylenes is also indicated, according to processes well known in the art (see for instance Sandler and Karo "Organic Functional Group Preparations", Academic Press, Inc., New York, N.Y.— 1968) . The basic product for the preparation of such products, as previously illustrated, is the diacylfluoride of formula:

$$FCO-CF_2O-(CF_2CF_2O)_m-(CF_2O)_n-CF_2-COF \quad (III),$$

which in Table 1 is identified as A.

TABLE 1

| Z | REAGENTS | POLYMERS |
|---|---|---|
| 1. —CH$_2$OH | A + LiAlH$_4$ | polyesters polyurethanes |
| 2. —CH$_2$O(CH$_2$CH$_2$O)$_s$H s = 1–3 | 1. + ethylene oxide | polyesters polyurethanes |
| 3. —CH$_2$OSO$_2$CF$_3$ | 1. + CF$_3$SO$_2$F in triethylamine | polyethers polyamides |
| 4. —CH$_2$NH$_2$ | 3. + NH$_3$ liq. | polyureas polyamides |
| 5. —CH$_2$O(CH$_2$CH$_2$O)$_s$SO$_2$—C$_6$H$_4$—CH$_3$  s = 0–3 | 1. o 2. + CH$_3$—C$_6$H$_4$—SO$_2$Cl | polyethers polyamides |
| 6. —CH$_2$O(CH$_2$CH$_2$O)$_s$SO$_2$CH$_3$  s = 0–3 | 1. o 2. + CH$_3$SO$_2$Cl | polyethers polyamines polyamides |
| 7. —CH$_2$OCH$_2$CH$_2$NH$_2$ | 5. + a. NaN$_3$ b. reduction | polyureas polyamides |
| 8. CH$_2$CN | 3. + NaCN | polytriazines |
| 9. CH$_2$OCH$_2$CH$_2$CN | 5. + NaCN | polytriazines |
| 10. —CH$_2$—N(CO)$_2$(norbornene) | 4. + O=(CO)$_2$(norbornene) | polyimides |
| 11. —CH$_2$SH | 4. + a. CH$_3$—CO—S$^-$Na$^+$ b. hydrolysis | polysulphides |

TABLE 1-continued

| Z | REAGENTS | POLYMERS |
|---|---|---|
| 12. $-CH_2OCH_2CH_2SH$ | 7. + a. $CH_3-CO-S^-Na^+$<br>b. hydrolysis | polysulphides |
| 13. $-CH_2O(CH_2CH_2O)_sSi(CH_3)_2Cl$<br>s = 0–3 | 1. o 2. + $Si(CH_3)_2Cl_2$<br>in pyridine | polysiloxanes |
| 14. $-CH_2-N$(phthalimide group) | 4. + pyromellitic dianhydride | polyimides |
| 15. $-CH_2O(CH_2CH_2O)_s-CO-NH-$(tolyl-NCO)<br>s = 0–3 | 1. o 2. + toluene diisocyanate (TDI) | polyurethanes<br>polyureas |
| 16. $-CH_2O(CH_2CH_2O)_s-CO-NH-CH_2-$(isophorone)-NCO | 1. o 2. + isophorone diisocyanate (IPDI) | polyurethanes<br>polyureas |
| 17. $-CH_2O(CH_2CH_2O)_s-CO-$(C$_6$H$_4$)$-COOMe$<br>s = 0–3 | 1. o 2. + dimethyl terephthalate | polyesters |
| 18. $-CH_2O(CH_2CH_2O)_s-CH_2-COOEt$<br>s = 0–3 | 1. o 2. + $Cl-CH_2COOEt$ | polyesters |
| 19. $-CH_2O(CH_2CH_2O)_s-P$(N$_3$P$_3$Cl$_2$ ring)<br>s = 0–3 | 1. o 2. + hexachlorocyclotriphosphazene | poly-<br>phosphazenes |
| 20. $-CH_2OCH_2-CH$—$CH_2$ (epoxide) | 1. + $ClCH_2-CH$—$CH_2$ (epichlorohydrin) | polyamines |

Some working examples of the present invention are now given, which have a merely illustrative purpose, but are not limitative of the scope of the invention itself.

EXAMPLE 1

In a 100 ml three-neck flask, equipped with a mechanical stirrer and a dropping funnel, 100 ml of anhydrous ethylacerate and 17.68 g (0.14 equivalents) of 4,4'-methylenphenylendiisocyanate (MDI) were introduced in nitrogen atmosphere. The reactor was brought to 80° C. and 100 g (0.07 equivalents) of a hydroxy-terminated perfluoropolyoxyalkylene of formula:

$$H(OCH_2CH_2)_{1.5}OCH_2-CF_2O-(CF_2CF_2O)_m-(CF_2O)_n-CF_2-CH_2O(CH_2CH_2O)_{1.5}H$$

were added dropwise, having m/n=1, number average molecular weight $M_n$=2825, number average equivalent weight $E_n$=1414, functionality f=1.995, obtained according to the chromatographic enrichment method described in Italian patent application No. 2774/MI 91A, starting from the corresponding product having f=1.95. The dropwise addition lasted two hours. The reaction was carried out, always at 80° C. and under stirring, for further 30 minutes. Then the solvent was distilled and the reaction mixture was cooled at 70° C. and thoroughly degassed. 3.03 g (0.067 equivalents) of butandiol (BDO) were then added. The reaction mixture was vigorously stirred for 45 sec. The so obtained resin was poured in a mould and maintained at 220° C. for 1.5 minutes and then at 130° C. for 7 hours, in order to complete the polymerization. The polymer was detached from the mould and maintained at room temperature for a week before proceeding to mechanical tests, the relevant results being reported in Table 2.

EXAMPLE 2 (comparative)

Example 1 was repeated in the same conditions, using 100 g (0.067 equivalents) of a hydroxy-terminated perfluoropolyoxyalkylene having the same structure of Example 1, but with $M_n=2796$, $E_n=1497$ and $f=1.868$; 16.7 g (0.134 equivalents) of MDI; 2.86 g (0.060 equivalents) of BDO.

The mechanical tests on the polymer samples, obtained according to what described in Example 1, are reported in Table 2.

EXAMPLE 3 (comparative)

Example 1 was repeated in the same conditions, using 108.9 g (0.075 equivalents) of a hydroxy-terminated perfluoropolyoxyalkylene having the same structure as in Example 1, but with $M_n=2800$, $E_n=1440$ and $f=1.953$; 18.88 g (0.15 equivalents) of MDI; 3.22 g (0.072 equivalents) of BDO.

The mechanical tests on the polymer samples, obtained according to what described in Example 1, are reported in Table 2.

By comparing the data obtained for the products of Examples 1–3, a considerable improvement of the mechanical properties under heating is noted (for instance at 135° C. an increase of at least 50% for the tensile strength was obtained). At room temperature the differences are less evident, as it is known that polyurethanes give rise to strong molecular interactions, which have the effect of improving the mechanical properties also for low molecular weights. However, such effect is significant only at low temperatures: when the temperature increases the interactions are less strong and the phenomena of physical "entanglement" among the macromolecules prevail.

TABLE 2

|  | EX. 1 (f = 1.995) | EX. 2 (f = 1.868) | EX. 3 (f = 1.953) |
|---|---|---|---|
| Hardness Shore A (ASTM D-2240) | 80 | 84 | 83 |
| Mechanical resistance (ASTM D-412) | | | |
| *at 23° C. | | | |
| Modulus 20% | 15 | 13.1 | 15.2 |
| Modulus 100% | 6.6 | 5.4 | 6.5 |
| Modulus 200% | 9.1 | 6.7 | 8.4 |
| Tensile strength (MPa) | 17.9 | 8.7 | 16.5 |
| Elongation at break (%) | 492 | 492 | 577 |
| *at 100° C. | | | |
| Modulus 20° C. | 6.3 | 5.0 | 6.0 |
| Modulus 100% | 2.9 | 1.76 | 2.3 |
| Modulus 200% | 3.5 | 2.25 | 3.2 |
| Tensile strength (MPa) | 7.3 | 2.9 | 6.9 |
| Elongation at break (%) | 490 | 395 | 527 |
| *at 135° C. | | | |
| Modulus 20° C. | 3.95 | 1.95 | 3.1 |
| Modulus 100% | 1.3 | 0.62 | 1.1 |
| Modulus 200% | 1.9 | 0.72 | 1.5 |
| Tensile strength (MPa) | 4.6 | 0.87 | 3.1 |
| Elongation at break (%) | 456 | 375 | 476 |

EXAMPLE 4

In a 100 ml two-neck flask, equipped with a mechanical stirrer and a condenser connected to a vacuum pump, 15 g of a hydroxy-terminated perfluoropolyoxyalkylene having number average molecular weight $M_n=1160$ and $f=1.995$; 2.75 g of dimethylterephthalate (DMT); 5 μl of titanium isopropylate Ti(i-PrO)$_4$ as catalyst, were introduced. The hydroxy-terminated perfluoropolyoxyalkylene with $f=1.995$ had the same structure of that employed in Example 1 and was obtained according to the same method, starting from a product having $f=1.95$. The system was then submitted to some cycles of evacuation and subsequent nitrogen flow, so as to eliminate traces of oxygen and moisture present in the reaction system. The temperature was then brought and kept for two hours at 150° C. When the distillation of methanol formed during the reaction was over, the reactor was evacuated to a pressure of 15 mmHg and kept at 150° C. for one additional hour. The temperature was then brought and kept for one hour at 180° C. and subsequently at 220° C. for one hour (pressure= 0.1 mmHg), until a viscous mass was obtained. After cooling at room temperature, the polymer was discharged from the reactor. It appeared as a rubbery and sticky solid.

On the polymer, dissolved in Delifrene$^{(R)}$ LS/trifluoroethanol in volume ratio 9/1 (Delifrene$^{(R)}$ LS=1,1,2-trichlorotrifluoroethane), intrinsic viscosity measurements were carried out (method ASTM D2857-70). The results are reported in Table 3.

Dynamic viscosity measurements were carried out directly on the polymer melt, at a temperature of 30° C., using a rheogoniometer Rheometrics$^{(R)}$ RMS 800 with a parallel plate configuration, dynamically by varying the oscillation frequency $\nu$ from $10^{-2}$ to $10^{+2}$ rad/sec. The sample viscosity resulted to be frequency-dependent for $\nu>10^{-1}$ rad/sec, while for lower values the behaviour was newtonian with a value of dynamic viscosity $\eta_d$ equal to about 150,000 poise. In Table 3 the value of the storage modulus G' (at $\nu=10$ rad/sec) is also reported, which is a measurement of the elastic component of the polymer.

EXAMPLE 5 (comparative)

Example 4 was repeated in the same conditions, using 15 g of a hydroxy-terminated perfluoropolyoxyalkylene having the same structure of Example 4, but with $M_n=1220$ and $f=1.95$. The obtained polymer appeared as a viscous liquid.

Intrinsic and dynamic viscosity measurements were carried out thereon, according to what described in Example 4. The results are reported in Table 3.

During the dynamic measurements, the sample showed a newtonian behaviour on the whole field of the examined frequencies, with a value of $\eta_d$ equal to about 1,000 poise.

Comparing the $\eta_d$ values of Examples 4 and 5 in the area with newtonian behaviour (for instance $\nu=10^{-1}$ rad/sec) and applying the well known relation $\eta=k.M_v^{3.4}$, where $M_v$ is the viscosimetric average molecular weight, a ratio $M_v(Ex.4)/ -M_v (Ex.5)=4.36$ is obtained. Therefore the molecular weight of the polymer according to the invention is over 4 times greater than the molecular weight of the corresponding polymer of the prior art.

TABLE 3

|  | EX. 4 (f = 1.995) | Ex. 5 (f = 1.950) |
|---|---|---|
| Intrinsic viscosity [η] (dl/g) | 0.40 | 0.14 |
| Dynamic viscosity $\eta_d$ $\nu = 10^{-1}$ (poise) | 150,000 | 1,000 |
| Storage modulus (G') (dyne/cm$^2$) | 300,000 | 180 |

EXAMPLE 6

In a 100 ml flask, 300 mg of paraformaldehyde were dissolved in 1.1 ml of H$_2$SO$_4$ at 96% at room temperature, obtaining a limpid solution. To such solution, 10 g of a hydroxy-terminated perfluoropolyoxyalkylene of formula:

$$HOCH_2-CF_2O-(CF_2CF_2O)_m-(CF_2O)_n-CF_2-CH_2OH$$

having m/n=1, $M_n$=2000, f=1.995 and $T_g$=−113° C., were added under stirring. Such product was obtained according to the chromatographic enrichment process described in Italian patent application No. 2774/MI 91A, starting from the corresponding product having f=1.94.

The mixture was kept under stirring until its viscosity allowed it. After 24 hours the mixture was dissolved in 1 l of Delifrene$^{(R)}$ LS and sulphuric acid was neutralized by adding 20 ml of a solution of $NH_3$ in Delifrene$^{(R)}$ LS (2 mols/l).

The precipitated ammonium sulphate was filtered and the solvent evaporated to constant weight.

By $^1$H-NMR and $^{13}$C-NMR analysis the following structure for the so obtained polymer was determined:

$$-[(-CF_2O-(CF_2O)_a-(CF_2CF_2O)_b-CF_2-CH_2OCH_2OCH_2]_n-$$

with b/a=1 and n=14.

In Table 4 the values of the number and weight average molecular weight $M_n$ and $M_w$ are reported, obtained by gel permeation chromatography (GPC). For such measurements a set of 4 columns. Ultrastyragel-Waters$^{(R)}$ ($10^6$-$10^5$-$10^4$-$10^3$ Å) was employed at 30° C. with the Delifrene$^{(R)}$ LS/acetone azeotropic mixture 8/2 by volume as solvent (b.p.=39° C.). The calibration curve was experimentally determined using as standards narrow fractions of perfluoropolyoxyalkylenes with different molecular weights.

In Tables 4 and 5 the values of the intrinsic and dynamic viscosity are also reported, determined according to what described in Example 1, along with the $T_g$ values, obtained by differential scanning calorimetry (DSC) (calorimeter Mettler$^{(R)}$ TA 2000 with heating program from −170° to +200° C., cooling program from +100° to −170° C. and scanning rate of 10° C./min).

From the dynamic viscosity measurements, we have noticed that the sample has a strong dependence on the oscillation frequency in the whole examined range (from $10^{-3}$ to $10^{+2}$ rad/sec, with viscosity varying from $3.5.10^6$ to $10^4$ poise). The non-newtonian behaviour is due to the very high molecular weight of the sample.

EXAMPLE 7 (comparative)

Example 6 was repeated in the same conditions, using 15 g of a hydroxy-terminated perfluoropolyoxyalkylene having the same structure of Example 5, but with $M_n$=2050 and f= 1.95. The data relating to the obtained polymer are reported in Table 4. The dynamic viscosity $\eta_d$ is about 2.6 $10^2$ poise, constant in the frequency range from $10^{-2}$ to $10^{+2}$ rad/sec.

In Table 5 the values of G' (storage modulus), of G" (loss modulus) and of the dissipation factor tanδ= G"/G' are reported, determined at different frequencies for the polymers obtained in Examples 6 and 7. Upon comparing the obtained data, we observe that in the polymer of the invention (Example 6) the dissipative component (measured by G") and the elastic one (measured by G') are equivalent, whereby the tanδ value is about 1 and maintains approximately constant for the whole frequency range. This does not occur for the comparative polymer (Example 7), in which the dissipative component prevails with respect to the elastic component and it increases enormously when the frequency rises. This shows that the polymer of the invention has good elastic properties, while the comparative polymer appears quite unsuitable for the uses previously described.

TABLE 4

|  | EX. 6 (f = 1.995) | EX. 7 (f = 1.950) |
|---|---|---|
| $M_n$ | 150,000 | 29,000 |
| $M_w$ | >500,000 | 100,000 |
| [η] (dl/g) | 1.05 | 0.20 |
| $T_g$ (°C.) | −117.0 | −117.5 |

TABLE 5

| EX. | Frequency (rad/sec) | G' (dyne/cm²) | G" (dyne/cm²) | tanδ |
|---|---|---|---|---|
| 6 | $10^2$ | 150,000 | 130,000 | 0.86 |
|  | $10^1$ | 120,000 | 110,000 | 0.92 |
|  | $10^0$ | 100,000 | 90,000 | 0.90 |
|  | $10^{-1}$ | 13,000 | 12,500 | 0.96 |
|  | $10^{-2}$ | 10,200 | 10,000 | 0.98 |
| 7 | $10^2$ | 1,800 | 25,000 | 13.88 |
|  | $10^1$ | 18 | 2,500 | 138.8 |
|  | $10^0$ | 0.18 | 250 | 1388 |
|  | $10^{-1}$ | n.d | 25 | n.d. |
|  | $10^{-2}$ | n.d | 2.5 | n.d. | n.d.: not determinable

We claim:

1. Fluorinated polymers having thermoplastic elastomeric properties, comprising perfluoropolyoxyalkylene sequences having the formula:

$$-CF_2O-(CF_2CF_2O)_m-(CF_2O)_n-CF_2- \qquad (I)$$

wherein (i) the ratio m/n is from 0.2 to 5, and (ii) the number average molecular weight of the perfluoropolyoxyalkylene sequences is from 500 to 10,000;

the perfluoropolyoxyalkylene sequences being linked to each other by organic groups derived from one or more condensation monomers having a functionality equal to 2;

the fluorinated polymers having a number average molecular weight at least 50% higher than that of the corresponding polymers obtained by polycondensation of perfluoropolyoxyalkylenes with sequences corresponding to formula (I) and having a functionality equal to or lower than 1.96;

wherein the fluorinated polymers are obtained by reacting the condensation monomers with perfluoropolyoxyalkylene starting materials having the formula:

$$Z-CF_2O-(CF_2CF_2O)_m-(CF_2O)_n-CF_2-Z \qquad (VI)$$

wherein (a) the ratio m/n is from 0.2 to 5 and each Z is a reactive group which will react in a polycondensation reaction with the condensation monomers;

(b) the perfluoropolyoxyalkylene starting materials have a functionality equal to at least 1.97 and a number average molecular weight for the perfluoropolyoxyalkylene sequences between the Z groups of from 500 to 10,000.

2. The fluorinated polymers according to claim 1, wherein the perfluoropolyoxyalkylene sequences have a number average molecular weight from 1000 to 4000.

3. The fluorinated polymers according to claim 1, wherein the perfluoropolyoxyalkylenes of formula (VI) have a functionality equal to at least 1.99.

4. The fluorinated polymers according to claim 1, wherein the fluorinated polymers are selected from the group consisting of polyesters, polyurethanes, polyethers, polyamines, polyureas, polyamides, polyimides, polytriazines, polysulfides, and polysiloxanes.

* * * * *